(12) United States Patent
Cuddihy et al.

(10) Patent No.: US 8,554,461 B2
(45) Date of Patent: Oct. 8, 2013

(54) SYSTEM AND METHOD FOR PRE-DEPLOYING RESTRAINTS COUNTERMEASURES USING PRE-CRASH SENSING AND POST-CRASH SENSING

(75) Inventors: Mark A. Cuddihy, New Boston, MI (US); Manoharprasad K. Rao, Novi, MI (US); Tai Luu, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1015 days.

(21) Appl. No.: 11/778,299

(22) Filed: Jul. 16, 2007

(65) Prior Publication Data

US 2008/0201042 A1   Aug. 21, 2008

Related U.S. Application Data

(60) Provisional application No. 60/890,569, filed on Feb. 19, 2007.

(51) Int. Cl.
*G06F 17/10* (2006.01)
*G08G 1/16* (2006.01)
*G01S 13/00* (2006.01)
*B60Q 1/00* (2006.01)

(52) U.S. Cl.
USPC .............. 701/301; 342/70; 340/436; 340/903

(58) Field of Classification Search
USPC ................. 701/300, 9, 41, 45, 58, 68, 71–72, 701/78–85, 87–93, 95–98, 110, 301–302, 701/70, 1, 32.2; 434/65; 342/24, 70, 118, 342/54, 173; 340/905, 435, 436, 3.41, 903
See application file for complete search history.

(56) References Cited

U.S. PATENT DOCUMENTS

| | | | |
|---|---|---|---|
| 5,785,347 A | 7/1998 | Adolph et al. | |
| 5,826,216 A | 10/1998 | Lyons et al. | |
| 5,959,552 A | 9/1999 | Cho | |
| 5,997,033 A | 12/1999 | Gray et al. | |
| 6,012,008 A * | 1/2000 | Scully | 701/45 |
| 6,087,928 A * | 7/2000 | Kleinberg et al. | 340/436 |

(Continued)

FOREIGN PATENT DOCUMENTS

| | | |
|---|---|---|
| DE | 4320147 A1 | 1/1994 |
| DE | 19740020 A1 | 3/1999 |

(Continued)

OTHER PUBLICATIONS

Chinese Office Action for corresponding Application No. 200810007233.9, mailed Aug. 18, 2011, 3 pages.

*Primary Examiner* — Muhammad Shafi
(74) *Attorney, Agent, or Firm* — Brooks Kushman P.C.; Frank A. MacKenzie (57) ABSTRACT

A system and method for deploying a restraint system in a vehicle that is in a pre-collision state with an object is provided. The system includes a pre-crash sensing system and a controller. The pre-crash sensing system is adapted to transmit pre-crash signals. The controller is configured to determine a closing velocity between the vehicle and the object. The controller is further configured to determine a predicted collision time based on the closing velocity and deploy the restraint system at a predetermined deployment time prior to the predicted collision time in response to the pre-crash signals.

17 Claims, 5 Drawing Sheets

(56) References Cited

U.S. PATENT DOCUMENTS

| | | |
|---|---|---|
| 6,173,224 B1 | 1/2001 | Riesner et al. |
| 6,419,262 B1 | 7/2002 | Fendt et al. |
| 6,498,972 B1 | 12/2002 | Rao et al. |
| 6,519,519 B1 | 2/2003 | Stopczynski |
| 6,532,408 B1 | 3/2003 | Breed |
| 6,712,659 B2 | 3/2004 | Chen et al. |
| 6,725,141 B2 | 4/2004 | Roelleke |
| 6,775,605 B2 | 8/2004 | Rao et al. |
| 6,784,791 B2 | 8/2004 | Rao et al. |
| 6,801,843 B2 | 10/2004 | Rao et al. |
| 6,918,611 B1 | 7/2005 | Winters et al. |
| 2002/0027339 A1 | 3/2002 | Breed |
| 2003/0030583 A1 | 2/2003 | Finn |
| 2003/0051530 A1 | 3/2003 | Eisele et al. |
| 2003/0060980 A1 | 3/2003 | Prakah-Asante et al. |
| 2003/0139867 A1* | 7/2003 | Browne et al. ............ 701/45 |
| 2003/0209893 A1 | 11/2003 | Breed et al. |
| 2004/0129478 A1 | 7/2004 | Breed et al. |
| 2004/0167702 A1* | 8/2004 | Isogai et al. ............ 701/96 |
| 2004/0268030 A1* | 12/2004 | Cheung ............ 711/105 |
| 2005/0017488 A1 | 1/2005 | Breed et al. |
| 2005/0065688 A1* | 3/2005 | Rao et al. ............ 701/45 |
| 2005/0114000 A1 | 5/2005 | Cashler |
| 2005/0131607 A1 | 6/2005 | Breed |
| 2005/0168329 A1 | 8/2005 | Kuttenberger et al. |
| 2005/0187685 A1 | 8/2005 | Kondo et al. |
| 2005/0248136 A1 | 11/2005 | Breed et al. |
| 2005/0278330 A1* | 12/2005 | Smith ............ 707/7 |
| 2006/0052924 A1 | 3/2006 | Prakah-Asante et al. |
| 2006/0095183 A1 | 5/2006 | Schuller et al. |
| 2006/0187009 A1* | 8/2006 | Kropinski et al. ............ 340/435 |
| 2006/0208169 A1 | 9/2006 | Breed et al. |
| 2007/0228703 A1 | 10/2007 | Breed |
| 2007/0228704 A1 | 10/2007 | Cuddihy et al. |
| 2007/0228705 A1* | 10/2007 | Rao et al. ............ 280/735 |
| 2007/0233353 A1* | 10/2007 | Kade ............ 701/96 |
| 2007/0288704 A1* | 12/2007 | Mizuno ............ 711/154 |

FOREIGN PATENT DOCUMENTS

| | | |
|---|---|---|
| DE | 10244205 A1 | 3/2004 |
| EP | 0728624 A2 | 8/1996 |
| EP | 1316480 A2 | 6/2003 |
| GB | 2405250 A | 2/2005 |
| JP | 3632619 * | 12/2002 |
| JP | 3632619-2 * | 12/2002 |
| JP | 3632619 A * | 12/2002 |
| JP | 2002362301 * | 12/2002 |
| WO | 03006291 A1 | 1/2003 |
| WO | 2004043745 A1 | 5/2004 |
| WO | 2004069602 A1 | 8/2004 |
| WO | 2005044636 A1 | 5/2005 |

* cited by examiner

SYSTEM AND METHOD FOR PRE-DEPLOYING RESTRAINTS COUNTERMEASURES USING PRE-CRASH SENSING AND POST-CRASH SENSING

CROSS-REFERENCE TO RELATED APPLICATIONS

This application claims the benefit of U.S. provisional application Ser. No. 60/890,569 filed Feb. 19, 2007; which is hereby incorporated by reference in its entirety.

This application is related to U.S. application Ser. No. 11/277,999, filed on Mar. 30, 2006, now U.S. Pat. No. 8,463,500, entitled "Method for Operating a Pre-Crash Sensing System to Deploy Airbags Using Inflation Control," which is hereby incorporated in its entirety by reference; and to co-pending U.S. application Ser. No. 11/278,043, filed on Mar. 30, 2006, entitled "Method for Operating a Pre-Crash Sensing System to Deploy Airbags Using Confidence Factors Prior to Collision," which is hereby incorporated in its entirety by reference.

BACKGROUND

1. Technical Field

Embodiments of the present invention generally relate to a system and method for deploying a restraint system in a vehicle.

2. Background Art

Vehicles employ accelerometers that measure vehicle deceleration in response to a crash and deploy a restraint system in response to the vehicle deceleration. In addition, vehicles may use mechanical velocity sensors to confirm a crash and deploy airbags based on confirmation signals generated from the mechanical velocity sensors. Such devices are generally used for passive restraint systems, such as airbags and seatbelt systems.

Pre-crash sensing systems may include the use of radar, lidar and vision sensing devices to perform object classification. Automotive manufacturers are beginning to recognize the need to implement a pre-crash sensing system that is adapted towards deploying a restraint system prior to actual impact. Such a system generally needs a high degree of confidence in collision prediction to ensure that the deployment of the restraint system occurs when the vehicle is experiencing an unavoidable collision.

Accordingly, it would be desirable to provide a system and method for deploying a restraint system at an optimal time before actual vehicle impact. It would also be desirable to provide a system for predicting the time of impact based on pre-crash data and deploying the restraint system at the optimal time before vehicle impact to ensure that the restraint system is deployed at an early stage to reduce occupant injury.

SUMMARY

In one non-limiting embodiment, a system and method for deploying a restraint system in a vehicle that is in a pre-collision state with an object is provided. The system includes a pre-crash sensing system and a controller. The pre-crash sensing system is adapted to transmit pre-crash signals. The controller is configured to determine a closing velocity between the vehicle and the object in the pre-collision state. The controller is also configured to determine a predicted collision time based on the closing velocity and deploy the restraint system at a predetermined deployment time prior to the predicted collision time in response to the pre-crash signal.

DETAILED DESCRIPTION

Figure 1:
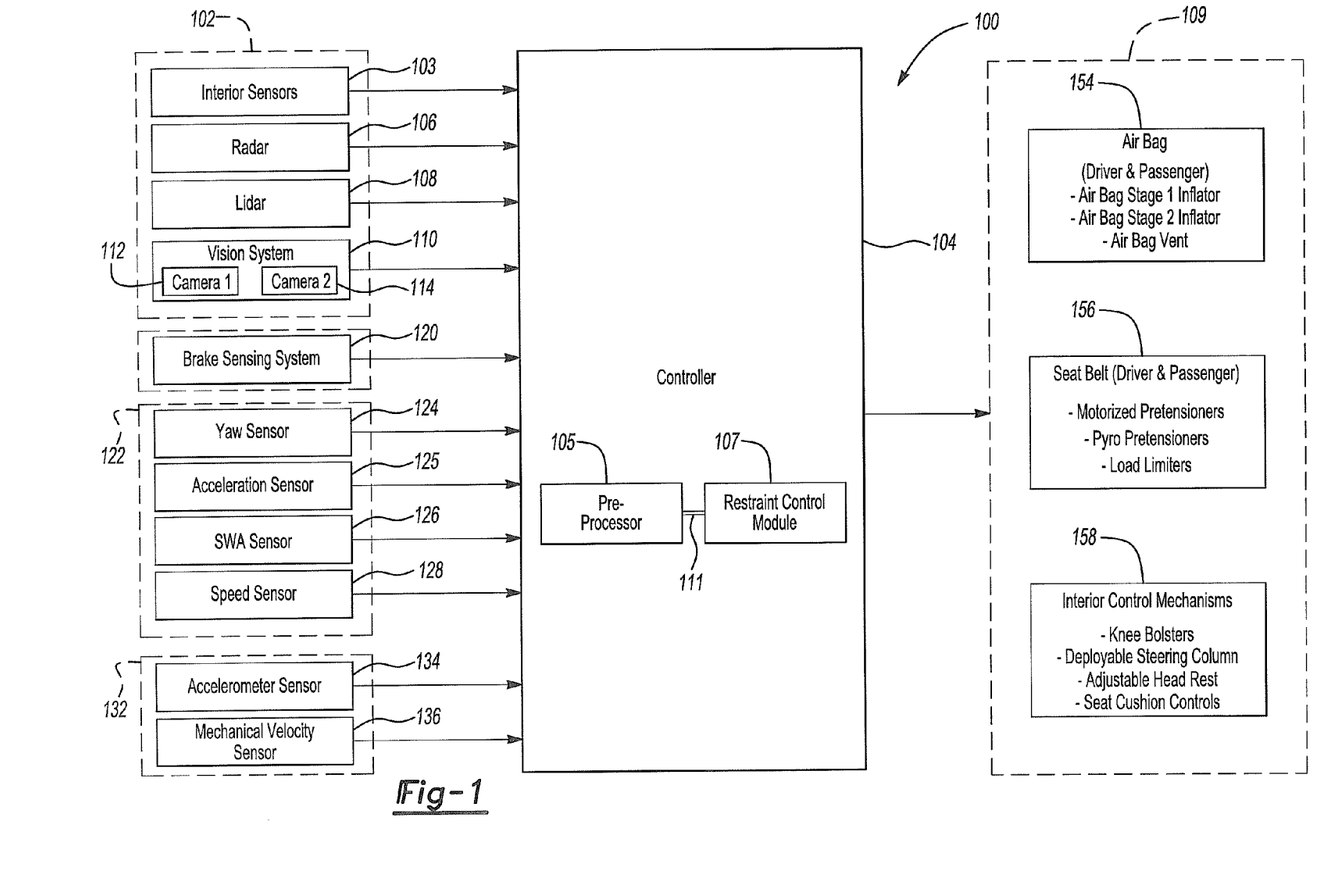
FIG. 1 illustrates a system for deploying a restraint system in a vehicle in accordance to one embodiment of the present invention.

FIG. 1 illustrates a system 100 for deploying a restraint system in a vehicle in accordance to one embodiment of the present invention. The system 100 comprises a pre-crash sensing system 102 and a controller 104. The pre-crash sensing system 102 is adapted to present pre-crash signals to the controller 104 when the vehicle is in a pre-collision state with an object. The object may be an on-coming vehicle or other item that may come into contact or collide with the vehicle. In one example, the vehicle may be a vehicle that is traveling at any speed and in any direction towards the object. In another example, the object may be traveling at a slower speed than the vehicle and in the same direction of the vehicle.

The pre-collision state generally refers to the state at which the vehicle and the object are headed towards an unavoidable collision. The pre-crash signals generally refer to detectable characteristics that exist between the vehicle and the object when the vehicle and the object are in the pre-collision state.

The controller 104 generally comprises a pre-processor 105 and a restraint control module (RCM) 107. The pre-processor 105 is adapted to process the pre-crash signals and transmit such data over a multiplexed data bus 111 to the RCM 107. In one example, the multiplexed data bus 111 may be implemented as a high-speed controller area network (CAN). In another example, the multiplexed data bus 111 may be implemented as a local area network (LAN). The RCM 107 is adapted to deploy a restraint system 109 in response to receiving the pre-crash signals (via the pre-processor 105). The pre-crash sensing system 102 generally comprises a plurality of interior sensors 103, a radar 106, a lidar 108, and a vision system 110. The radar 106 and the lidar 108 may detect and present information related to the speed and direction of the object. The radar 106 and the lidar 108 may be positioned at various locations of the vehicle. The radar 106 and the lidar 108 may also detect the position of obstacles relative to the vehicle. The pre-processor 105 may collect and process data from the radar 106 and the lidar 108 and transmit such information over the multiplexed data bus 111 to the RCM 107.

The vision system 110 includes first and second cameras 112 and 114 positioned at predetermined vehicle positions. The first and second cameras 112 and 114 may provide information related to the position and the direction of the object to the pre-processor 105. The pre-processor 105 may process data from the first and second cameras 112 and 114 and transmit such data to the RCM 107 over the multiplexed data bus 111. The RCM 107 may use the pre-crash signal to deploy the restraint system 109 prior to an actual collision taking place.

The first and second cameras 112 and 114 may use triangulation techniques and optical signal processing techniques to determine not only the presence and distance of an object from the vehicle, but the overall size of the object. The first and second cameras 112 and 114 may determine the area, the height, width or any combination of the area, height, or width of the object. In one example, the first and second cameras 112 and 114 may be implemented as high speed cameras that are capable of operating in excess of 100 Hz. For example, the first camera 112 and the second camera 114 may be CMOS-based high dynamic range cameras capable of operating under different lighting and contrast conditions.

The plurality of interior sensors 103 may be adapted to provide occupant information to the controller 104. Such occupant information may be part of the pre-crash signals. In one example, the interior sensors 103 may provide information related to weight and position of the occupants in the vehicle. In addition, the interior sensors 103 may provide seatbelt buckle usage status for the occupants in the vehicle. The controller 104 may perform occupant classification based on the occupant information received from the interior sensors 103. Occupant classification may be based on the weight percentiles, seatbelt buckle usage status of the occupants, and occupant seating arrangements in the vehicle.

In general, the pre-processor 105 may use the pre-crash signals transmitted by the pre-crash sensing system 102 to determine the closing velocity of the vehicle with respect to the object and to perform object classification. The pre-processor 105 performs object classification to determine the type of object that may be approaching the vehicle and the expected collision overlap between the object and the vehicle. The pre-processor 105 may also use the pre-crash signals to determine collision confidence and various collision angles. The RCM 107 may pre-deploy the restraint system 109 (airbags and other safety measures) prior to a predicted collision time based on the pre-crash signals.

The pre-processor 105 may determine the collision type by classifying the particular type of object that is approaching the vehicle. The pre-processor 105 may classify the object as a particular type of moving object (e.g., truck, car or motorcycle) or stationary object (e.g., street sign, tree or pole) based on the pre-crash data received from the radar 106, the lidar 108, and the vision system 110. In addition, if the object is an on-coming vehicle, the pre-processor 105 may determine whether the front, rear or side portion of the on-coming vehicle is expected to collide with the vehicle based on the pre-crash signals. The pre-processor 105 may also determine the collision overlap range with respect to the on-coming vehicle. In one example, the collision overlap range may have an overlap of between 50% and 100%. The range of collision overlap is not limited to a range of between 50% and 100%. Such range limits may be varied based on the design criteria of a particular implementation.

A brake sensing system 120 is configured to present brake information to the controller 104. The brake information includes information related to whether the brakes were applied while the vehicle was in the pre-collision state. The pre-processor 105 may use such brake information as a trigger to recalculate the closing velocity and the predicted collision time of the object while the vehicle is in the pre-collision state. The use of the brake information and the recalculation of the closing velocity will be discussed in more detail in connection with FIG. 2.

A vehicle dynamic sensing system 122 is adapted to provide information related to the dynamic movement of the vehicle. The vehicle dynamic sensing system 122 comprises a yaw rate sensor 124, an acceleration sensor 125, a steering wheel angle (SWA) sensor 126, and a speed sensor 128. The yaw rate sensor 124 is adapted to provide information related to the angular rate of the vehicle as the vehicle rotates around a vehicle axis. The yaw rate sensor 124 may be positioned at a location that generally corresponds to the center of gravity for the vehicle. The acceleration sensor 125 may measure the longitudinal acceleration of the vehicle. In one example, the yaw rate sensor 124 and the acceleration sensor 125 may be integrated into an inertial measuring unit (IMU). The IMU may detect the roll rate of the vehicle, the pitch rate, and the lateral acceleration of the vehicle along with the longitudinal acceleration and the yaw rate of the vehicle.

The SWA sensor 126 may be coupled to a shaft of the vehicle steering wheel (not shown). The SWA sensor 126 may provide the particular angular position of the steering wheel. The SWA sensor 126 may also provide information related to the amount of torque that is being applied to the steering wheel by the driver. The SWA sensor 126 may generate an absolute position or a relative position of the steering wheel depending on the type of vehicle dynamic system that is implemented. The SWA sensor 126 generates a signal which corresponds to the angular movement of the driver's hand wheel. The SWA sensor 126 senses and transmits information related to the absolute or relative position of the steering wheel shaft, and the amount of torque applied to the steering wheel to the controller 104.

In one example, the speed sensor 128 may be positioned proximate to wheels of the vehicle. In another example, the speed sensor 128 may be positioned at a transmission output shaft of the vehicle. The speed sensor 128 may be implemented as a toothed-wheel type sensor that generates pulses in response to the rotational rate of each wheel. In one example, the speed sensor 128 may generate a signal based on 8,000 pulses per mile (8KPPM) in response to the rotational rate of each wheel. In general, the speed sensor 128 may be used to sense and transmit information related to the speed of the vehicle to the controller 104.

A post-crash sensing system 132 is adapted to transmit information related to post-crash measurements to the controller 104. The post-crash sensors 132 generally comprise a plurality of accelerometers 134 and a plurality of mechanical velocity sensors 136 positioned about the vehicle for confirming impact. The mechanical velocity sensors 136 may or may not be implemented in the vehicle. The mechanical velocity sensors 136 generally provide an additional level of confirmation for impact by determining where the impact took place. The mechanical velocity sensors 136 may be positioned at the front, rear and side positions of the vehicle.

The accelerometers 134 may be configured to measure car body accelerations about the x-axis (longitudinal acceleration), the y-axis (lateral acceleration) and z-axis (vertical acceleration), respectively. The accelerometers may be configured to present the longitudinal, lateral and vertical acceleration to the controller 104. The x-axis of the vehicle is defined as the axis extending between the fore and aft portions of the vehicle (or the axis that extends lengthwise of the vehicle). The y-axis of the vehicle is defined as the axis extending from the driver's side of the vehicle to the passenger's side of the vehicle (e.g., the axis extending the width of the vehicle). The z-axis of the vehicle is defined as the axis extending from the top to bottom of the vehicle.

The RCM 107 is configured to actuate safety measures in the restraint system 109. The restraint system 109 generally comprises driver and passenger airbags 154, driver and passenger seatbelts 156, and interior control mechanisms 158. The RCM 107 is configured to deploy driver and passenger airbags 154 in response to the pre-crash signals prior to the predicted collision time. Each airbag 154 may include a dual stage inflator (not shown) and a vent (not shown). The controller 104 may control the activation timings of the dual stage inflators for the airbags 154. The vents for the airbags 154 may be selectively opened by the controller 104. At the point of airbag deployment, the vents of the airbags 154 are closed to prevent gases from escaping from the airbags 154. During impact, the vents of the airbags 154 are controlled to open post-impact to allow for the controlled transfer of energy between the occupant and the airbag 154 during the collision. By opening the vents, gases escape from the airbag 154 thereby allowing the airbags 154 to ride down the velocity of the occupant in a controlled manner.

The airbags 154 may be inflated independently at two different gas flow rates. In a first inflation rate, the airbags 154 may be inflated at a first gas flow rate for 70% of the total gas discharge. In a second inflation rate, the airbags 154 may be inflated at a second gas flow rate for the remaining 30% of the total gas discharge. The first and second gas flow rates may be varied depending on the particular type of restraint system used for a particular vehicle.

The RCM 107 may deploy the airbags 154 at an initial restraint deployment time (IRDT) or at a predetermined deployment time prior to the predicted collision time in response to the pre-crash signals. The predetermined deployment time may correspond to the amount of time that is optimal for controlling the inflation of the airbags 154 for enhanced occupant protection. In one example, such an IRDT may be 40 ms prior to when the impact is predicted to take place. Other examples may include the RCM 107 deploying the airbags 154 at any time between the range of 1 ms to 100 ms prior to when the impact is predicted to take place. Such a deployment prior to the predicted collision time allows the airbags 154 to fully inflate and reach proper pressure before occupant contact.

The RCM 107 may control various characteristics of occupant seatbelts 156. For example, the RCM 107 may control motorized pre-tensioners, pyrotechnic pre-tensioners and load limiters associated with the seatbelts 156 in response to the pre-crash and post-crash signals. The RCM 107 may selectively deploy control mechanisms for the seatbelts 156 for occupants detected in the vehicle (via the interior sensors 103) at the time of the collision. The RCM 107 may also selectively control the motorized pre-tensioners, pyrotechnic pre-tensioners and load limiters for the occupants that are detected in the vehicle at the time of the collision. The RCM 107 may also control various interior control mechanisms 158. Such mechanisms 158 may include deployable knee bolsters, a deployable steering column, airbag tether release mechanism for dual depth airbags, moveable headrests and seat cushion controls.

Figure 2:
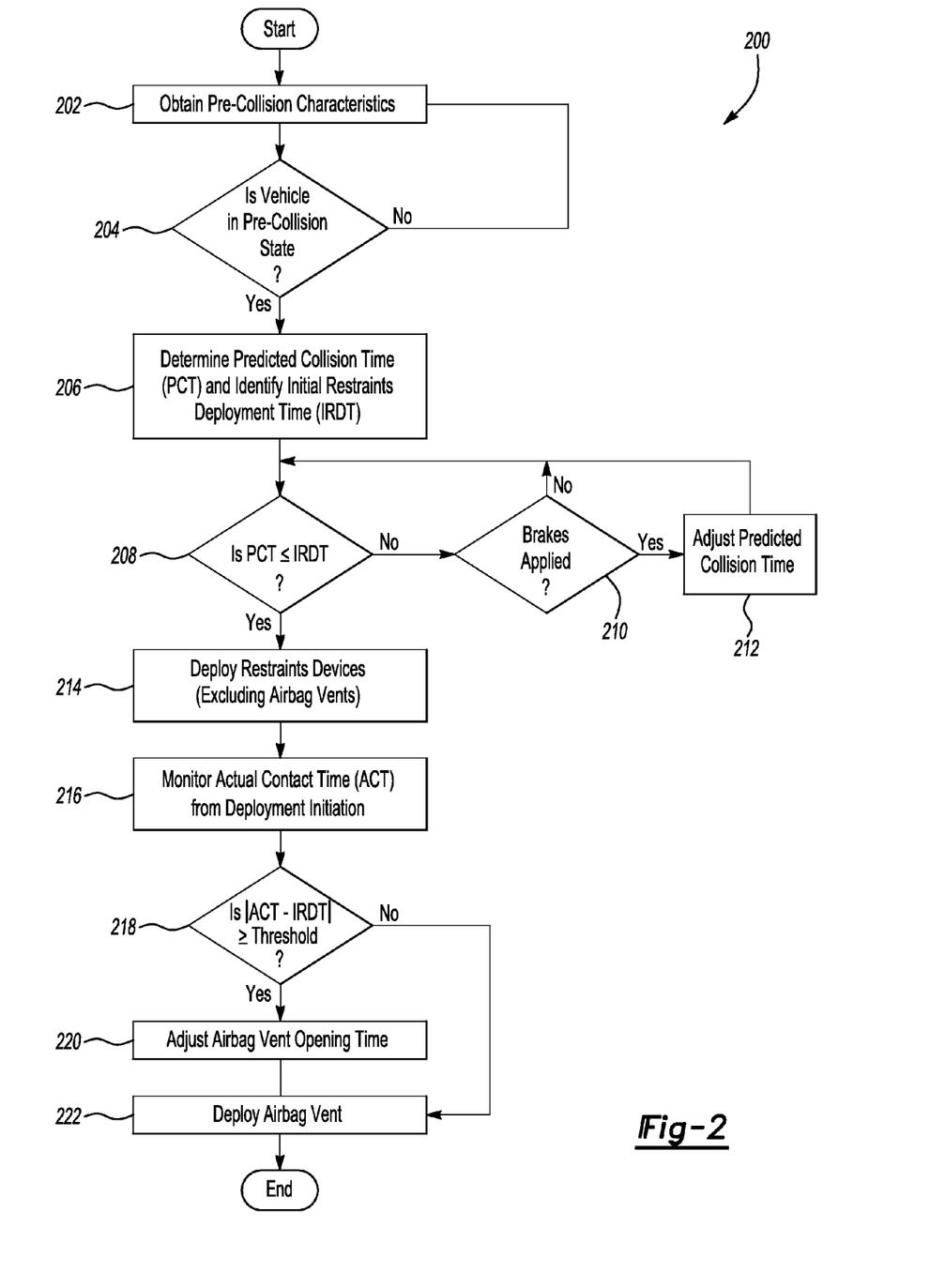
FIG. 2 illustrates a method for deploying a restraint system in a vehicle in accordance to one embodiment of the present invention.

FIG. 2 illustrates a method 200 for deploying the restraint system 109 in a vehicle in accordance to one embodiment of the present invention. In step 202, the controller 104 obtains the pre-crash signals from the pre-crash sensing system 102 to perform object classification and determine the closing velocity of the on-coming vehicle or object. The controller 104 also receives information related to seatbelt buckle usage status of the occupants in the vehicle and occupant information such as occupant weight or visual characteristics to perform occupant (driver and/or passenger) classification.

In step 204, the controller 104 determines if the vehicle is in a pre-collision state with the object. The controller 104 determines if the vehicle is in the pre-collision state by assessing the closing velocity and the expected collision overlap as determined while performing object classification and pre-crash signal analysis. If the controller 104 determines that the vehicle is not in a pre-collision state with the on-coming vehicle or object, then the method 200 moves back to step 202. If the vehicle is in a pre-collision state with the on-coming vehicle or object, then the method 200 moves to step 206.

In step 206, the controller 104 determines the predicted collision time based on the closing velocity of the on-coming vehicle or object. The controller 104 also selects the IRDT. As noted in connection with FIG. 1, one example may include that the IRDT is preset to 40 ms prior to when the impact is predicted to take place.

In step 208, the controller 104 compares the predicted collision time against the IRDT. If the predicted collision time is greater than the IRDT, then the method 200 moves to step 210. If the predicted collision time is less than or equal to the IRDT, then the method 200 moves to step 214.

In step 210 the controller 104 determines whether the brakes were applied. If the brakes were applied, then the method moves to step 212.

In step 212, the controller 104 recalculates the predicted collision time based on the deceleration of the vehicle in response to the brakes being applied. The controller is adapted to receive longitudinal acceleration information from the acceleration sensor 125 (or the IMU), or any module in the vehicle that is configured to provide longitudinal acceleration.

In step 214, the controller 104 deploys the airbags 154 at the IRDT and continues to keep the vents of the airbags 154 in a closed state.

In step 216, the post-crash sensing system 132 provides post-crash measurements to the controller 104 to monitor actual contact time from the point at which the airbags 154 had been deployed and while the vents are in the closed state. The actual time the collision takes place (or actual contact time (ACT)) may be earlier or later than the predicted collision time. The controller 104 may use the actual contact time to modify airbag vent release.

In step 218, the controller 104 calculates the absolute value of the difference between the actual contact time and the IRDT and compares the absolute value to a predetermined time threshold value. If the absolute value of the difference between the actual collision time and the IRDT is greater than or equal to the predetermined time threshold value, then the method moves to step 220. Such a condition may be indicative of an opportunity to improve the restraint system performance by modifying the airbag vent opening time from an originally estimated vent opening time. The modified airbag vent opening time is based on the actual contact time.

In step 220, the controller 104 adjusts the airbag vent opening time that is used to control the opening of the vents. If the actual contact time is greater than IRDT, then the vent opening time may be delayed with respect to the originally estimated vent opening time to account for the additional time the airbags 154 stay deployed. If the actual contact time is less than IRDT, then the airbag vents may be opened earlier than the originally estimated airbag vent opening time. If the absolute value of the difference between the actual contact time and the IRDT is below the predetermined time threshold value, then the method moves to step 222. Such a condition may be indicative of there being no need to modify the airbag vent opening timing.

In step 222, the controller 104 opens the vents of the airbags 154 to allow for the controlled transfer of energy between the occupant and the airbags 154.

Figure 3:
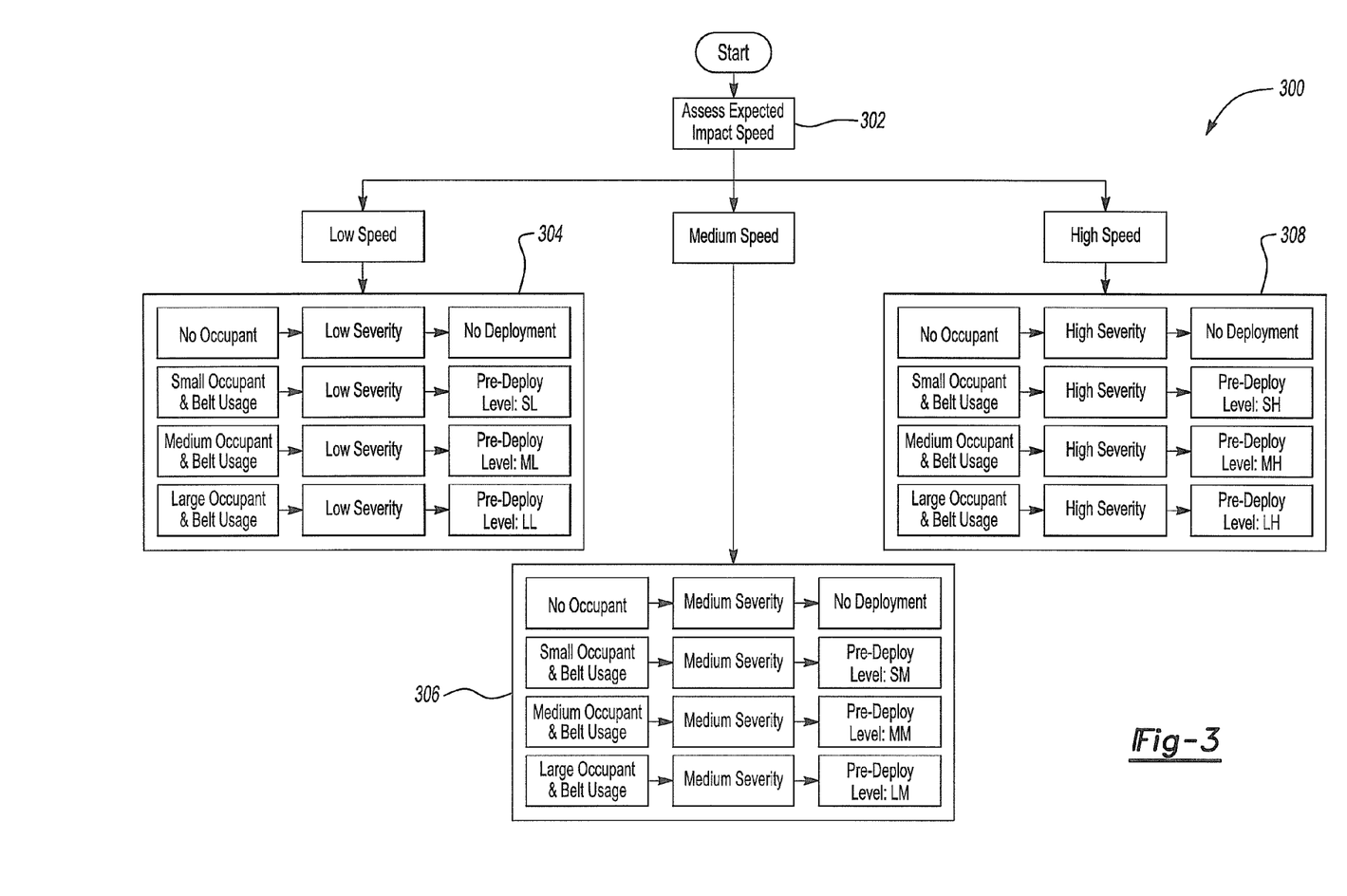
FIG. 3 illustrates various deployment measures based on closing velocity and expected impact speeds in accordance to one embodiment of the present invention.

FIG. 3 illustrates a method for deploying the restraint system 109 based on expected collision speeds in accordance to one embodiment of the present invention. In step 302, the controller 104 assesses the expected impact speed. If the impact speed is expected to be low, the method 300 moves to step 304. In step 304, the severity may be low due to the expected low impact speed and the restraint system 109 may be deployed in a different sequence, depending on the detected size of the occupant. In step 306, the severity may be medium based on the expected medium impact speed and the restraint system 109 may be deployed in a different sequence, depending on the detected size of the occupant. In step 308, the severity may be high based on the expected high impact speed and the restraint system 109 may be deployed in a different sequence, depending on the detected size of the occupant.

Figure 4:
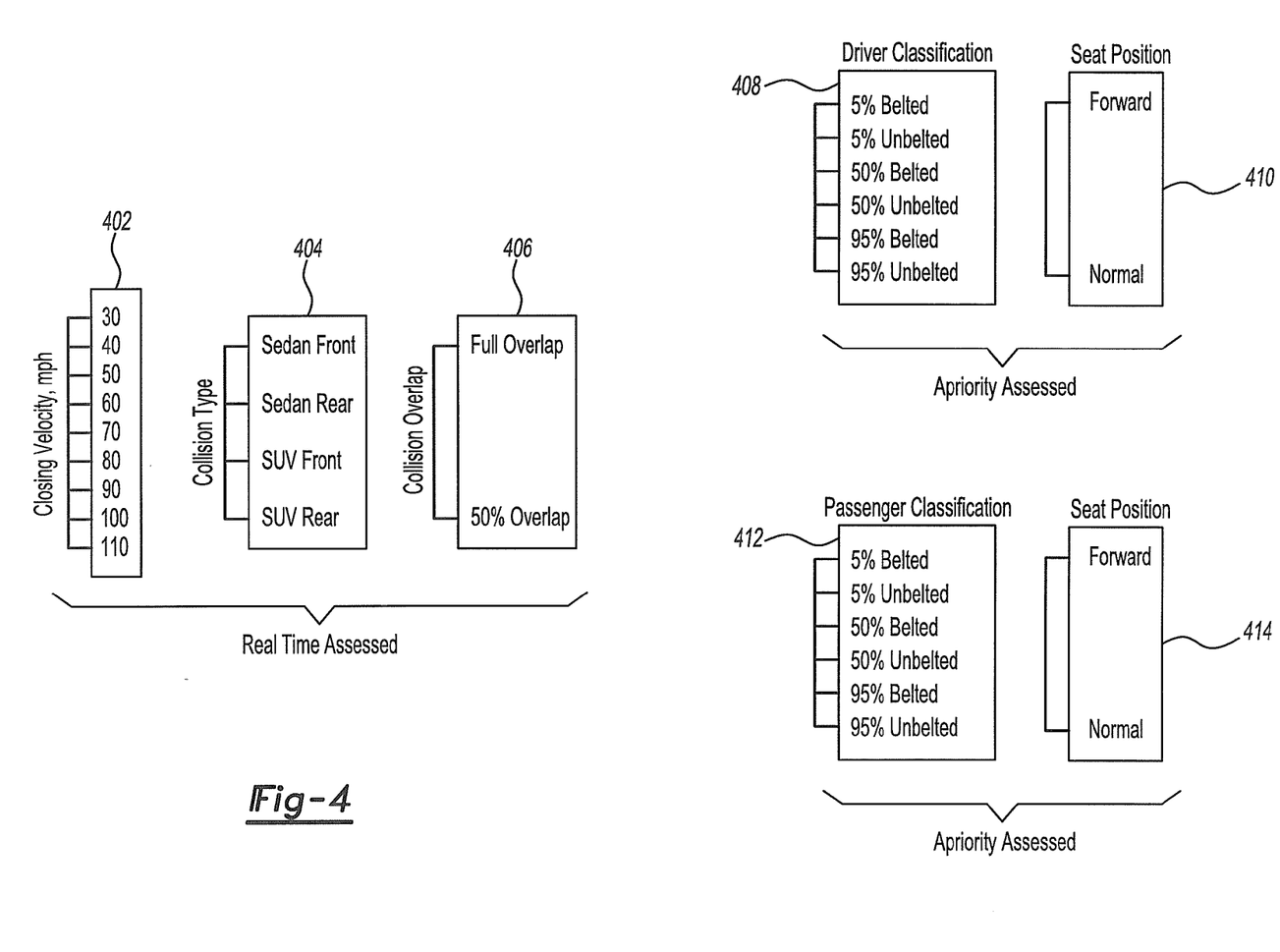
FIG. 4 illustrates a deployment scheme in accordance to one embodiment of the present invention.

FIG. 4 illustrates a deployment scheme 400 in accordance to one embodiment of the present invention. In block 402, the controller 104 determines the closing velocity of the on-coming vehicle or object with respect to the vehicle. In block 404, the controller 104 determines the collision type of the object. In one example, the collision type may indicate whether the on-coming vehicle is a sedan, SUV or truck. The controller 104 also determines the part of the on-coming vehicle that is expected to collide with the vehicle. Block 404 generally corresponds to the controller 104 performing object classification.

In block 406, the controller 104 determines the collision overlap between the on-coming vehicle and the vehicle. The controller 104 may be adapted to perform object classification, determine the closing speed and determine the amount of collision overlap to establish collision confidence rates. With a high collision confidence rate, the controller 104 may determine the predicted collision time and deploy the airbags 154 at the predetermined deployment time.

In block 408, the controller 104 classifies the driver based on various driver characteristics and seatbelt buckle usage status. Such driver characteristics may be based on weight percentages. In block 410, the controller 104 determines the seat position of the driver to determine whether the driver's seat is positioned in a forward position or is in a normal position.

In block 412, the controller 104 classifies the passenger based on various passenger characteristics and seatbelt buckle usage status. Such passenger characteristics may be based on weight percentages. In block 414, the controller 104 determines the seat position of the passenger to determine whether the passenger's seat is positioned in a forward position or is in a normal position.

Figure 5:
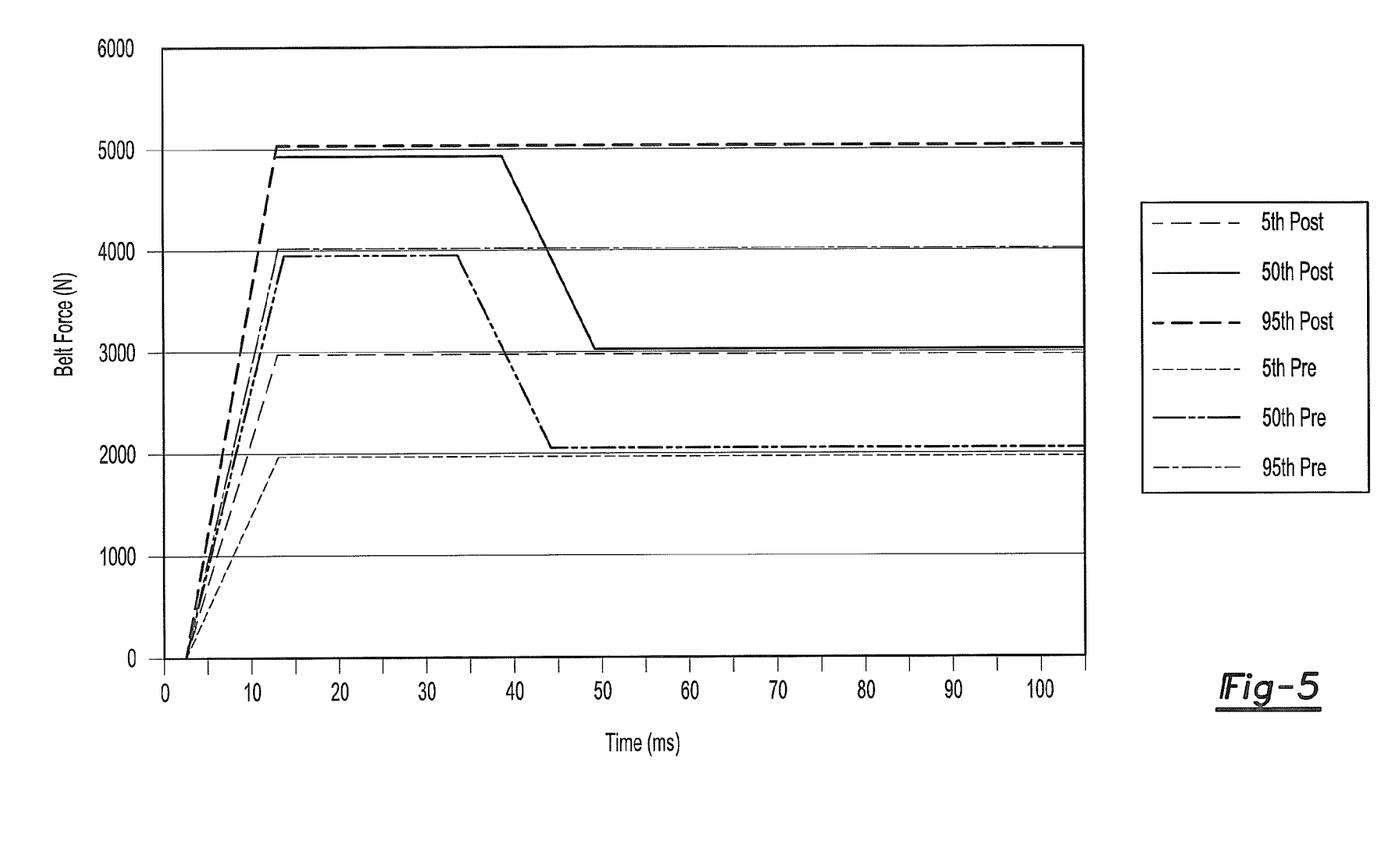
FIG. 5 illustrates load limiter curves for seatbelts in accordance to one embodiment of the present invention.

FIG. 5 illustrates load limiter curves for the seatbelts 156 in accordance to one embodiment of the present invention. The load limiter curves for the seatbelts 156 vary based on the detected occupant size (e.g., may be based on weight) and the restraint mode (e.g., either pre-deployment or post-crash deployment). A deployable release mechanism may allow the load limiters to maintain substantially different and generally lower loads on the occupant in pre-crash mode. In post-crash deployment, the deployable release mechanism may not be deployed and the load limiters perform at conventional high post-crash levels.

While the best mode for carrying out the invention has been described in detail, those familiar with the art to which this invention relates will recognize various alternative designs and embodiments for practicing the invention as defined by the following claims.

What is claimed:

1. A device comprising:
   a controller positioned within a vehicle and being configured to:
      determine a closing velocity between the vehicle and an object in a pre-collision state;
      determine a predicted collision time based on the closing velocity;
      deploy a restraint system including at least one airbag at a predetermined deployment time prior to the predicted collision time in response to pre-crash signals;
      monitor for a brake status signal indicative of brakes being applied to the vehicle;
      recalculate the closing velocity to produce a first predicted collision time if the brake status signal is detected prior to deploying the restraint system; and
      deploy the restraint system at the predetermined deployment time prior to the first predicted collision time in response to the pre-crash signals.

2. The device of claim 1 wherein the controller is further configured to classify the object as one of a particular type of moving object and a stationary object in response to the pre-crash signals and determine vehicle type information, vehicle contact information and collision overlap information if the moving object or the stationary object is an on-coming vehicle.

3. The device of claim 1 wherein the vehicle type information corresponds to whether the on-coming vehicle is one of a passenger car and a truck; the vehicle contact information corresponds to one or more of the front, side, and rear portions of the moving or stationary vehicle; and the collision overlap information corresponds to a collision overlap range of 50% to 100%.

4. The device of claim 1 wherein the controller is further configured to deploy the at least one airbag, each including a dual stage inflator and a vent, and wherein the at least one airbag is deployed at a first inflation rate and a second inflation rate while the vent is closed prior to an actual contact time.

5. The device of claim 4 wherein the controller is further configured to determine the actual contact time in response to post-crash signals that are indicative of a collision taking place between the vehicle and the object and to establish a predetermined time threshold value.

6. The device of claim 5 wherein the controller is further configured to adjust the opening of the vent based on the actual contact time, the predetermined deployment time and the predetermined time threshold value.

7. The device of claim 6, wherein the controller is further configured to control an activation timing of the dual stage inflator, the opening of the vent, a seatbelt pre-tensioner, a seatbelt pyrotechnic pre-tensioner, and a seatbelt load limiter.

8. A system for deploying a restraint system in a vehicle that is in a pre-collision state with an object, the system comprising:
   a pre-crash sensing system adapted to transmit pre-crash signals;
   a brake sensing system adapted to transmit a brake status signal that corresponds to brakes being applied to the vehicle; and
   a controller configured to determine a closing velocity between the vehicle and the object in the pre-collision state based on the pre-crash signals, determine a predicted collision time based on the pre-crash signals and the closing velocity, deploy the restraint system at a predetermined deployment time prior to the predicted collision time, recalculate the closing velocity to generate a first predicted collision time based on the brake status signal, and deploy the restraint system at the predetermined deployment time prior to the first predicted collision time in response to the pre-crash signals.

9. The system of claim 8 wherein the restraint system further comprises one or more dual stage inflator airbags each having a vent, the controller is further configured to deploy the airbags at first and second inflation rates while keeping the vents closed prior to an actual contact time.

10. The system of claim 9 further comprising a post-crash sensing system adapted to transmit one or more post-crash signals indicative of a collision taking place between the vehicle and the object, the controller is further configured to determine the actual contact time in response to the post-crash signals and establish a predetermined time threshold value.

11. The system of claim 10 wherein the controller is further configured to adjust the opening of the vents based on the actual contact time, the predetermined deployment time and the predetermined time threshold value.

12. A system for deploying a restraint system in a vehicle that is in a pre-collision state with an object, the system comprising:
   a pre-crash sensing system being configured to transmit at least one pre-crash signal;
   a brake sensing system being configured to transmit a brake status signal indicative of brakes being applied; and
   a controller being configured to:
      determine a closing velocity between the vehicle and an object in a pre-collision state;
      determine a predicted collision time based on the closing velocity;
      compare the predicted collision time to a predetermined deployment time (PDT), the PDT being indicative of an amount of time needed for controlling an inflation of at least one airbag within the restraint system;
      monitor for the reception of the brake status signal if the predicted collision time is greater than the predetermined deployment time; and
      recalculate the closing velocity to produce a first predicted collision time if the brake status signal is detected.

13. The system of claim 12 wherein controller is further configured to deploy the restraint system prior to the first predicted collision time in response to the at least one pre-crash signal.

14. The system of claim 13 wherein the controller is further configured to monitor for an actual contact time (ACT) corresponding to a time in which the vehicle establishes contact with an external object, the actual contact time being earlier than the first predicted collision time or later than the first predicted collision time.

15. The system of claim 14 wherein the controller is further configured to compare an absolute value of a difference between the ACT and the PDT to a predetermined threshold to determine whether to modify a vent opening time for the at least one airbag within the restraint system.

16. The system of claim 15 wherein the controller is further configured to delay the vent opening time if the absolute value of the difference between the ACT and the PDT is greater than the predetermined threshold.

17. The system of claim 16 wherein the controller is further configured to abstain from modifying the vent opening time in the event the absolute value of the difference between the ACT and the PDT is less than the predetermined threshold.

\* \* \* \* \*